Nov. 11, 1969   R. W. BARRINGTON   3,477,742
WEAR COMPENSATING BEARINGS FOR TRAILER HITCH
Filed March 13, 1968
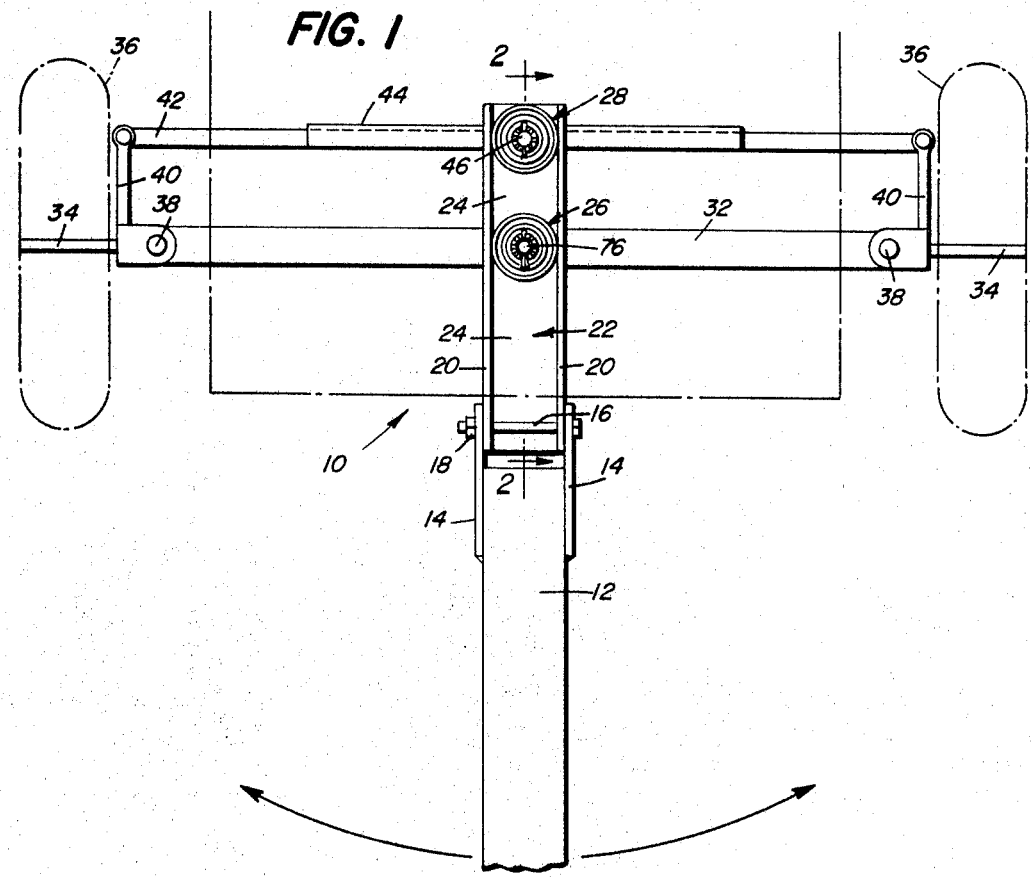
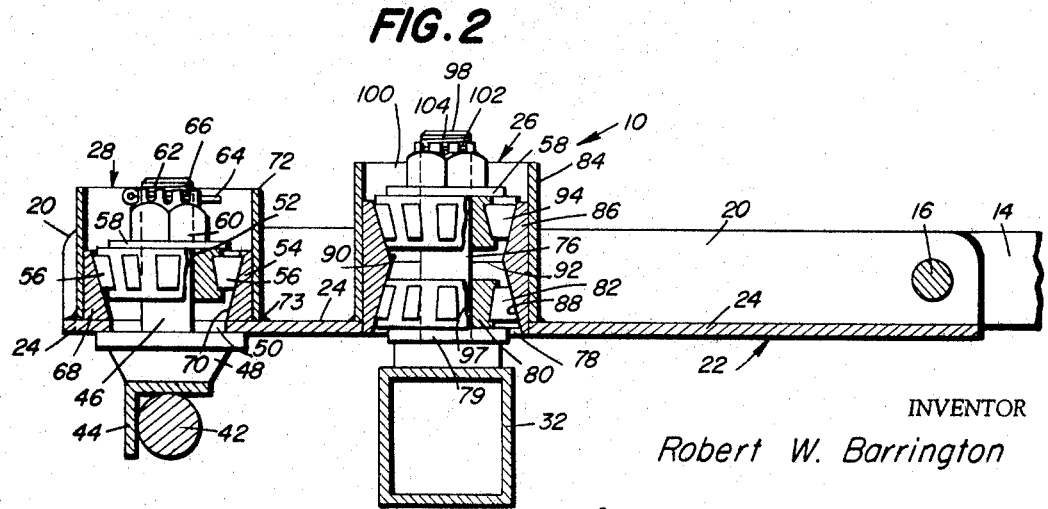
INVENTOR
Robert W. Barrington
BY Gustave Miller
ATTORNEY 3,477,742
WEAR COMPENSATING BEARINGS FOR
TRAILER HITCH
Robert W. Barrington, P.O. Box 34,
Throckmorton, Tex. 76083
Filed Mar. 13, 1968, Ser. No. 712,803
Int. Cl. B62d *13/04;* B60d *1/14*
U.S. Cl. 280—444                                             3 Claims

ABSTRACT OF THE DISCLOSURE

A trailer hitch used in combination with the axle and the steering tie rod for the wheels on the axle, wherein the trailer hitch draw bar is pivotally secured to both the axle and the trailer tie rod by adjustable tapered conical roller bearings that may be adjusted indefinitely for the life of the trailer vehicle, to compensate for wear, so as to maintain taut control of the tracking of the trailer, so that its tracking will truly follow that of the tractor vehicle and will avoid the reciprocating or weaving that is common with most trailer hitches as soon as some wear has taken place.

Object of the invention

This invention relates to an improved trailer hitch, and has for an object to provide a trailer hitch in combination with the axle and tie rod of the trailer vehicle with truly indefinitely adjustable bearing means that may be adjusted indefinitely, for the life of the trailer vehicle, to maintain tire tracking, to avoid reciprocation and weaving, that cuts down the weight of the trailer hitch parts, and thus cuts down the power waste and the cost of operation.

Brief summary

In brief, this invention is an improvement on applicant's prior Patent No. 2,470,842 of May 24, 1949 in providing indefinitely adjustable tapered roller bearing means in the pivots between the trailer hitch draw bar or tongue and the trailer vehicle axle and steering tie rod. The bearing bushings are provided with bearing surfaces that can readily be indefinitely adjusted to last out the life of the trailer vehicle.

Brief description of drawing

With the above and related objects in view, this invention consists in the details of construction and combination of parts, as will be more fully understood from the following description, when read in conjunction with the accompanying drawing, in which:

FIG. 1 is a plan view of the trailer hitch, per se, of this invention.

FIG. 2 is a sectional view, on line 2—2, through the improved bearings of this invention.

There is shown at 10 the trailer hitch of this invention secured to a conventional draw bar 12, one end of which is conventionally secured to a tractor or draft vehicle (not shown). Extending rearwardly from the draw bar 12 on opposite sides thereof are a pair of apertured ears 14 through which is placed a pivot bolt 16 and securing nut 18, the bolt 16 extending through the opposite sides 20 of a channel bar 22, the channel bar bottom part being indicated at 24.

Extending through the channel bar bottom part 24 are two pivot bearings 26 and 28. The first, or axle, bearing 26 has its pivot bolt head 30 secured to the trailer vehicle axle 32 as by welding or the like. The axle 32 has conventional stub axles 34 on which the usual trailer steering wheels 36 are journaled. The stub axles 34 are pivoted on pivots 38 through axle 32 to swing horizontally, and are each provided with rearwardly extending levers 40 pivotally secured to opposite ends of a tie rod 42. Securely fastened or welded to the mid portions of tie rod 42 is an angle iron 44, the angle iron 44 extending a substantial length on opposite sides of tie rod pivot bearing 28.

This tie rod bearing member 28 includes a pivot bolt 46 having a large head 48 secured, as by welding, to the angle iron 44 and thus to the tie rod 42.

The tie rod bearing 28 consists of the pivot bolt 46 extending through an aperture 50 through channel bar bottom part 24, aperture 50 being of lesser diameter than the bolt head 48, up through the cylindrical center 52 of a bearing raceway 54 having tapered bearing rollers 56. A washer 58 about the pivot bolt 46 over bearing raceway 54 is held by the hexagonal nut 60 threaded over the threaded end 62 of bolt 46 and is locked in adjusted tight position by the cotter pin 64 extending through the recesses 66 in the edge of hexagonal nut 60 aligned with a transverse aperture through the bolt 46.

The tapered rollers 56 ride on the slanted surface of conical bearing metal bushing 68 which may be Babbit, or other appropriate material. The conical bushing 68 has the slanted or angle surface 70 extending down substantially below the lower ends of tapered rollers 56, the surface 70 extending to the channel bar bottom part 24 about the aperture 50 and within a surrounding bearing cylindrical housing 72 welded at 73 to the channel bar bottom part 24 about the aperture 50. It will be noted that the angle surface 70 of bearing metal bushing 68 slants upwardly and outwardly from the aperture 50, and extends a substantial distance below the lower ends of the tapered bearing rollers 56. As a result, as inevitable wear takes place, the nut 60 may have its cotter pin 64 temporarily removed, permitting the hexagonal nut 60 to be tightened on its bolt 46, thus substantially extending the life of the bearing 28. It is expected that the nut 60 will be adjusted or tightened every time wear has taken place sufficiently to permit a one-sixth rotation of the hexagonal nut 60. In addition, of course, the bearing 28 will be lubricated in a conventional manner, and the bearing 28 may well be expected to outlast the life of the trailer vehicle to which this trailer hitch 10 is attached.

While the tie rod bearing 28 provides control of the tie rod 42, the axle bearing 26 provides the pivot connection between the draw bar 12 and the trailer vehicle, and thus carries a heavier load than the tie bearing 28. Accordingly, while the axle bearing 26 is made on the same principles as the tie bearing 28, the axle bearing 26 is a double bearing as follows. The axle bearing 26 includes the pivot bolt head 30 welded or secured to the trailer axle 32. The bolt head 30 has its bolt 76 extending up through an aperture 78 in channel bar bottom part 24. Supported on the bolt head 30 on its larger lower end 79 is a raceway 80 having tapered bearing rollers 82, the angle of the tapered rollers 82 being opposite to the angle of the tapered rollers 56 of bearing 28. Surrounding the aperture 78 and supported and secured on the channel bar bottom part 24 is the cylindrical bearing housing 84 of bearing 26.

Within the bearing housing 84 is bearing metal bushing 86, of similar material as the bearing metal bushing 68 of tie rod bearing 28, having a double frusto-conical surface. Both conical surfaces 88 and 90 slant outwardly from a meeting line 92. Thus, while the upper cone surface 90 is substantially identical with that at 70 of 28, the lower cone surface 88 is inverted with relation to its upper surface 90. The lower cone surface 88 is complementary to the lower tapered bearing rollers 82, and the upper cone surface 90 is complementary to upper tapered bearing rollers 94 in an upper raceway 96, spaced as much above the cone meeting line 92 as the lower tapered rollers 82 are below the cone meeting line 92, the cone surfaces 88 and 90 being each approximately equal to the cone surface 70. Extending through the cylindrical center shaftways 97 of both raceways 80 and 96 is the pivot bolt 76 terminating in a threaded end 98 for receiving a securing hexagonal nut 100, similar to nut 60 and likewise provided with recesses 102 in the nut edge aligned with a transverse aperture through the bolt 76 for removably receiving a locking cotter pin 104.

While this axle bearing 26 carries a much heavier load than the tie rod bearing 28, due to its double set of oppositely tapered bearing rollers 82 and 94, its life will be approximately equal to that of tie rod bearing 28. Axle bearing 26 will be lubricated conventionally, the same as tie rod bearing 28, and when wear takes place sufficiently to permit a one-sixth tightening rotation of the nut 100, cotter pin 102 will be temporarily removed for such tightening, and then replaced. Due to the length of the bearing surface between the adjacent ends of the lower and upper raceways 80 and 96, and more particularly, of their oppositely tapered bearing rollers 82 and 94, the life of the axle bearing 26 will be substantially equal to that of tie rod bearing 28 and thus be in excess of the trailer vehicle.

Abstract of drawings

In the drawings, like numbers refer to like parts, and for the purposes of explication, marshalled below are the numbered parts of the improved trailer hitch:

10 trailer hitch of this invention
12 draw bar
14 apertured ears on draw bar 12
16 pivot bolt, 14 to 12
18 nut on bolt 16
20 opposite sides of channel bar 22
22 channel bar
24 bottom part of channel bar 22
26 axle bearing
28 tie rod bearing
30 pivot bolt head of 26 secured to axle 32
32 trailer transverse axle
34 stub axles
36 trailer steering wheels
38 pivots for 34 on 32
40 rearwardly extending levers on 34 to tie rods 42
42 tie rod
44 length of angle iron secured on tie rod 42
46 pivot bolt of tie rod bearing 28
48 bolt head of 46
50 aperture in 24 for bearing 28
52 cylindrical center of raceway 54
54 raceway
56 tapered bearing rollers of 28
58 washer
60 nut on 62 of 46
62 threaded end of bolt 46
64 cotter pin
66 recesses in edge of nut 60
68 bearing metal bushing
70 angled or slanted bearing surface of 68
72 cylindrical housing of 28
73 weld securing 72 to 24
74 pivot bolt head of axle bearing 26
76 pivot bolt of 26
78 aperture in channel bottom part for bearing 26
79 lower end of lower raceway 80
80 lower raceway of 26
82 lower tapered bearing rollers of 26
84 cylindrical bearing housing of 26
86 bearing metal bushing of 26
88 lower cone bearing surface of 26
90 upper cone slanted bearing surface of 26
92 meeting line of 88 and 90
94 upper tapered bearing rollers of 26
96 upper raceway
97 cylindrical center shaftways of 80 and 96
98 threaded end of bolt 76
100 hexagonal nut of 76
102 recesses in edge of nut 100
104 cotter pin Although this invention has been described in considerable detail, such description is intended as being illustrative rather than limiting, since the invention may be variously embodied.

Having thus set forth and disclosed the nature of this invention, what is claimed is:

1. In a trailer hitch (10), in combination with a trailer vehicle having front steering wheels (36) connected by a tie rod (42), an elongated towing draw bar (12) adapted to be pivotally coupled to a draft vehicle at its forward end, a pivot pin (76) secured to the trailer vehicle axle (32) and disposed substantially perpendicularly thereof and to which said draw bar (12) is operatively pivotally connected (16) adjacent its rear end, and means for operatively pivotally (46) connecting said draw bar (12) to the tie rod (42) rearwardly of said pin (76), said last mentioned pivotal means (46) and said pin (76) providing pivots for permitting swinging movement of said tongue in substantially a horizontal plane and whereby the tie rod (42) will be moved laterally of the trailer vehicle, when said draw bar (12) is pivoted on said pin (76), for causing the steering wheels (36) of the trailer vehicle to be turned in the same direction that the forward end of said draw bar (12) is moved, said trailer hitch (10) being provided with adjustable wear compensating means associated with the journal of said pin (76) and of said pivotal means (46) to prevent reciprocating movement of the hitch (10) relatively to the trailer vehicle; the improvement being that said wear compensating means comprises a bearing housing (72 or 84), a conical bearing bushing (68 or 86) tapered upwardly and outwardly within said bushing housing (72 or 84), a pivot pin (46 or 76) extending up through said bushing (68 or 86) having a raceway (54 or 96) mounted thereabout, tapered rollers in said raceway (54 or 96) slanted complementary to the inner surface (70 or 88) of said bushing, the slanted dimension of the surface of said bearing bushing (68 or 86) being substantially greater than the slanted dimension of said tapered rollers (56 or 94) and a nut (66 or 100) threaded on said pins (46 or 76) urging said raceways (54 or 96) and tapered rollers (56 or 94) therewith downwardly against said slanted bushing surfaces (70 or 90).

2. The combination of claim 1, said wear compensating means in the case of said pivotal means for said axle (32) comprising, in addition, a lower inverted bushing bearing surface (88) tapered raceway (80) and tapered bearing rollers (82) below said first mentioned bearing surface (90), raceway (80) and tapered bearing rollers (94) about said same pivot pin (76) and urged upwardly when said nut (102) is tightened thereon.

3. In a trailer hitch (10), in combination with a trailer vehicle having front steering sheels (W6) connected by a tie rod (42), an elongated towing draw bar (12) adapted to be pivotally coupled to a draft vehicle at its forward end, a pivot pin (76) secured to the trailer vehicle axle (32) and disposed substantially perpendicularly thereof and to which said draw bar (12) is operatively pivotally connected (16) adjacent its rear end, and means for operatively pivotally (46) connecting said draw bar (12) to the tie rod (42) rearwardly of said pin (76), said last mentioned pivotal means (46) and said pin (76) pivotally connected (16) adjacent its rear end, and said tongue in substantially a horizontal plane and whereby the tie rod (42) will be moved laterally of the trailer vehicle, when said draw bar (12) is pivoted on said pin (76), for causing the steering wheels (36) of the trailer vehicle to be turned in the same direction that the forward end of said draw bar (12) is moved, said trailer hitch (10) being provided with adjustable wear compensating means associated with the journal of said pin (76) and of said pivotal means (46) to prevent reciprocating movement of the hitch (10) relatively to the trailer vehicle; the improvement being that said wear compensating means comprises, in the case of said pin (76), a pair of conical roller bearing raceways (80 and 96), a series of roller bearings (82 and 94) in each said raceways (80 and 96), said raceways (80 and 96) being internally cylindrical (97) complementary to said pivot pin (46), said tapered bearing raceways (80 and 96) having their larger ends juxtaposed in spaced apart relationship, a double tapered journal bushing (86) complementary to said pair of tapered bearing raceways (80 and 96) maintaining said tapered bearing rollers (82 and 94) in spaced apart relationship, a bearing cylindrical housing (84) operatively secured to said draw bar (12), said journal bushing (86) being mounted in said housing (84), said pin (76) being threaded (98), and a nut (100) on said threaded pin (76) adjustably urging said tapered bearing rollers (82 and 94) toward each other against the bearing surfaces (88 and 90) of said double tapered bushing (86), and in the case of said pivotal means (46) operatively connecting said draw bar (12) to said tie rod (42), comprises a threaded bolt (46) anchored (48) to said tie rod (42), and extending perpendicularly thereabove through a bearing housing (72) secured on said draw bar (12), an internally tapered bushing (68) journal mounted in said housing (72) with its smaller opening at its bottom, a tapered conical bearing raceway (54) having tapered roller bearings (56) in said raceway rotatable in said tapered bushing journal (68, 70), the initial internal height of said latter bushing journal (70) being substantially greater than the height of said bearing rollers (56), the upper portion of said tapered bearing bushing raceway (54) being initially complementary to said bearing roller (56), said raceway (54) about said bolt being externally tapered complementary to said tapered bearing bushing (70) and internally cylindrical (52) complementary to said pivot bolt (46) and a nut (60) on said threaded bolt (46) adjustably urging said tapered bearing rollers (56) downwardly against the bearing surface (70) of said internally tapered bushing journal (68).

References Cited

UNITED STATES PATENTS

| 1,592,068 | 7/1926 | Bennett | 280—103 |
| 2,470,842 | 5/1949 | Barrington | 280—444 |
| 2,826,466 | 3/1958 | Pritchard | 308—207 |

FOREIGN PATENTS

| 1,035,204 | 4/1953 | France. |
| 283,965 | 11/1952 | Switzerland. |

LEO FRIAGLIA, Primary Examiner

U.S. Cl. X.R.

308—207; 280—103